2,813,778

Patented Nov. 19, 1957

2,813,778

METHOD OF PREPARING AN ANHYDROUS HIGH BULK CALCIUM SULFATE

Calvin M. Tidwell, Medina, N. Y., assignor to Food Machinery and Chemical Corporation, San Jose, Calif.

No Drawing. Application July 19, 1951,
Serial No. 237,688

1 Claim. (Cl. 23—122)

The present invention relates to substantially anhydrous calcium sulfate of extremely high bulk densities and to a method for manufacturing such products.

In the employment of calcium sulfate for certain specified uses, particularly as a carrier or extender for insecticides and fungicides, it is extremely advantageous to employ a calcium sulfate which is as fluffy as possible, that is to say, which has an extremely high bulk density since the bulking property aids and increases the covering power possible of obtainment of the dust and at the same time aids in maintaining the dust particles at the situs of application. The effectiveness of a dusting material carrying an active ingredient as, for instance tetraethylpyrophosphate, is greatly increased where it is possible to maintain the dust for its effective life upon the foliage, blossoms or fruit to which it is applied, and with high bulk characteristics there is less likelihood of ordinary gravity loss which is encountered even with materials ground to a fineness of subdivision possible with present-day micro-grinding equipment.

It is an object of the present invention, therefore, to prepare anhydrous calcium sulfate in such fashion as materially to increase the bulk density of the resultant product.

In accordance with the principles of the present invention, anhydrous calcium sulfate which does not contain any substantial amount of so-called dead burned gypsum, is mixed with sufficient water to produce a pourable slurry. This mixing produces a reaction between the anhydrous calcium sulfate or anhydrite and the water to produce a crystalline hydrated calcium sulfate. The particle size of this crystalline product is essentially smaller than that of the starting anhydrite. This mixing and reaction produces, therefore, a suspension of finely crystalline material. The slurry is then dewatered in any convenient fashion and subsequently heated to a temperature sufficient to drive off the free water present in the suspension of dewatered product and, in addition, water of crystallization which may be combined with the calcium sulfate. The temperature at which the product is calcined for the elimination of combined water should be above 108° C. but below about 210° C. in order that the final product may be of the type of anhydrous calcium sulfate technically known as anhydrite, but not of the variety called dead burned anhydrite or dead burned gypsum.

Temperature control of the upper limit of the calcination is important since, at temperature exceeding about 210° C., a dead burned product is obtained which possesses little or no affinity for moisture, and a product is obtained, therefore, which has little or no utility as an extender or carrier for those organic insecticides and fungicides which are subject to chemical degradation in the presence of moisture as, for instance, tetraethylpyrophosphate. The latter compound is in and of itself a dessicant by reason of its exceptionally high affinity for moisture and its great tendency to absorb moisture from the surroundings such as the ambient atmosphere or other materials with which it is in contact.

The product resulting from the calcination of the dewatered slurry of anhydrite, when ground in the usual and conventional type of micro-grinders, possesses a bulk density of from 70 to 90 cubic inches per pound. This is in contrast to the bulk density of the original raw material, that is anhydrous calcium sulfate which has, when ground in the same equipment, a bulk density of from 35 to 45 cubic inches per pound.

It will be understood that the product can, of course, be made either from ordinary gypsum or from plaster of Paris by first calcining these products under temperature and time conditions suitable for the production of anhydrite and subsequently treating the anhydrite so obtained in the fashion outlined immediately above.

The following is a specific example of the manufacture of high bulk density anhydrite of the present invention.

*Example 1*

The raw material used was an anhydrite prepared by conventional means from the calcium sulfate waste obtained from the sea water magnesia process. This original anhydrite, after being ground through a micro-pulverizing mill, had a bulk density of 35 cubic inches per pound. This anhydrite was slurried with an excess of water to the consistency of a thin paste. The excess water was filtered off and the wet paste calcined overnight at 140° C. to less than 0.3% moisture. The calcined product was ground through the same micro-pulverizing mill and found to have a density of 70 cubic inches per pound.

*Example 2*

A calcium sulfate mud resulting as a waste product from an organic chemical reaction was dried at 140° C. to less than 0.3% moisture and ground through a micro-pulverizer mill. This anhydrite when micro-pulverized had a bulk density of 45 cubic inches per pound. A sample of this anhydrite was slurried in water at the ratio of approximately 1 part dry material to 7 or 8 parts water. After the hydration was complete, the excess water was filtered off and the paste dried and calcined at 140° C. to the same moisture content as stated above. A sample of this product was ground through the same micro-pulverizer and found to have a bulk density of 85 cubic inches per pound.

By the process of hydrating the anhydrite produced by the first calcination, it is believed that dihydrate particles of exceedingly small crystal size are produced which, upon a subsequent clacination, form exceedingly small particles of anhydrite. For use as a dust base for readily hydrolyzable organic insecticides, the product of the present invention, possesses great utility. Due to the fact that the bulking properties are high, the covering power is very high and gravity loss low.

Further, by reason of the great affinity for moisture of the anyhydrite, which must be prepared at temperatures below 210° C. to prevent production of dead burned anhydrite, organic insecticides such as tetraethylpyrophosphate are protected against hydrolysis and their effective activity prolonged. It is also believed that the amount of water used to hydrate the anhydrite prior to its calcination should be considerably in excess of that required to produce the dihydrate and, in fact, sufficient to produce a thin slurry so that the crystals of dihydrate do not have an opportunity to grow in size after their initial formation.

What is claimed is:

The method of preparing an anhydrous calcium sulfate of high bulk density which comprises first calcining calcium sulfate by heating the same at a temperature sufficient to drive water therefrom but below 210° C. to prepare an anhydrite capable of hydrating with water alone, finely grinding the so prepared anhydrite and then preparing a slurry thereof with water whereby calcium dihydrate is formed from the anhydrite, removing the excess water from the calcium dihydrate thus formed and then heating the dihydrate at a temperature below 210° C. until the total water content is below 0.3% and thereafter micro-pulverizing the calcined product whereby anhydrous calcium sulfate having a bulk density of 70 to 90 cubic inches per pound is produced.

References Cited in the file of this patent

UNITED STATES PATENTS 1,442,406  Hennicke _____ Jan. 16, 1923

OTHER REFERENCES

Mellor: "Comprehensive Treatise on Inorganic and Theoretical Chemistry," vol. 3, page 764, Longmans, Green & Co., New York, 1923.